Patented Feb. 3, 1942

2,272,154

UNITED STATES PATENT OFFICE 2,272,154

PHENOL FORMALDEHYDE CONDENSATION PRODUCTS

Reinhart Müller, Erkner, near Berlin, Germany, assignor, by mesne assignments, to Bakelite Corporation, a corporation of New Jersey No Drawing. Application November 12, 1938, Serial No. 240,005. In Germany November 16, 1937

4 Claims. (Cl. 260—57)

It is known that phenol-formaldehyde condensation products can be prepared with the aid of catalysts. Among these catalysts, various acids, bases and salts have already been suggested. Furthermore, processes are known wherein phenol and formaldehyde are reacted in the presence of relatively large amounts of magnesium oxide or magnesium hydroxide. Also the use of metals such as zinc or lead, as catalysts for reacting phenol with formaldehyde while heating over a period of several hours, is known.

It has now been found that phenol-formaldehyde condensation products having very valuable properties can be prepared by a more simple process, namely by reacting phenol with a commercial aqueous solution of formaldehyde in the presence of metallic magnesium. Even at room temperature a perceptible reaction occurs while at higher temperatures considerable heat of reaction is liberated. By heating the reaction mixture as by distillation in a reflux condenser, no residue of uncombined formaldehyde remains after a lapse of 40–50 minutes.

The reaction proceeds quite vigorously with finely pulverized magnesium, and magnesium in the form of a ribbon, foil, or shavings is also useful. Whenever an excess of magnesium is used, the residue remaining at the end of the reaction is recovered by screening out the shavings. Magnesium foil can also be suspended in the reaction vessel and later removed. The percentage range of metallic magnesium used as a catalyst according to the invention is very wide, from about 3 to 50 percent based on the weight of the used phenol.

Instead of formaldehyde, polymers thereof can be used. A sufficient amount of water must however be provided, in order that the reaction can take place.

As phenol components all phenols and phenol derivatives, especially all alkyl and aryl substituted phenols can be used. The phenols and aldehydes can be reacted in proportions ranging from excess phenol to a large excess, i. e. 2 to 3, of formaldehyde to each part of phenol.

The condensation may be carried out by heating under a reflux or without additional heating. In the latter case the chemical reaction itself causes a gradual increase of temperature which may be stopped by cooling when about 60° C. are reached. On avoiding a further rise of temperature a complete reaction of the used amount of formaldehyde is reached in the course of approximately 48 hours.

By treating phenol with aqueous formaldehyde while using metallic magnesium as a catalyst, one obtains as a reaction product first a thin, liquid, alcohol-soluble condensation product which can be diluted with constantly increasing quantities of water and hardens quickly when heated. This condensation product loses its water solubility upon further heating and can be evaporated under vacuum to yield a solid resin which in contrast to the other known phenol-aldehyde resins is not wholly alcohol-soluble, but nevertheless is readily fusible. This solid, fusible phenol-formaldehyde condensation product hardens under heat with extraordinary rapidity and is distinguishable in its hardened state by its excellent chemical resistance, especially its unusually high alkali resistance.

The water soluble condensation product or a solution thereof and the solid resin prepared therefrom are adapted to many uses, namely for the impregnation of fibrous material, for the production of molding mixtures, etc.

The heretofore known condensation product prepared with the aid of a zinc and lead catalyst and several hours heating can be easily distinguished from that prepared in accordance with the teachings of this invention more especially because condensation with lead or zinc yields a benzene-soluble, fluid resin, which retains its benzene-solubility even on evaporation to a solid resin. These solid resins require such long hardening times, that they cannot be used for many technical purposes.

On reacting phenol and aldehyde by using magnesium oxide or hydroxide as catalysts no complete reaction of the used catalyst is reached and it is very difficult to free the reaction product from the unreacted amount of the oxide or hydroxide catalyst.

Example 1

100 parts by weight of phenol
100 parts by weight of 40% formaldehyde and
3 parts by weight of magnesium shavings are heated in a reflux condenser for 40–50 minutes, until all the formaldehyde is combined. After the removal of the remaining catalyst, the water soluble condensation product is evaporated in a vacuum. A solid, fusible condensation product amounting to 121% based on the phenol used is obtained.

Example 2

100 parts by weight of commercial tricresol, containing
    40 parts by weight of m-cresol
    40 parts by weight p-cresol
    10–15 parts by weight of o-cresol
    5–10 parts by weight xylenol
80 parts by weight of 40% formaldehyde and
5 parts by weight of magnesium shavings are heated for 1 hour in a reflux condenser, until all the formaldehyde is combined. After the removal of the remaining catalyst, the liquid reaction product is separated from the supernatant aqueous layer and evaporated in a vacuum. A solid fusible resin amounting to about 114% based on the cresol used is obtained.

*Example 3*

1000 parts by weight of phenol
1000 parts by weight of 40% formaldehyde and
100 parts by weight of magnesium shavings are mixed and brought to reaction by agitating without additional heating. The gradual rising of the temperature of the reaction mixture is stopped by cooling, when about 60° C. are reached. After about 48 hours standing the reaction is completed and the reaction product is separated from the remaining catalyst and freed from water by evaporation in a vacuum. A solid fusible condensation product is obtained.

What is claimed is:

1. Process of preparing a condensation product of the phenol-aldehyde type characterized in the liquid, water-soluble form as hardenable under the action of heat which comprises condensing a phenol with formaldehyde in the presence of metallic magnesium as a catalyst and water.

2. Process of preparing a condensation product of the phenol-aldehyde type characterized in the liquid or fusible solid form as hardenable under the action of heat which comprises condensing a phenol and aqueous formaldehyde in the presence of 3–50% metallic magnesium based on the weight of the phenol.

3. Process of preparing a condensation product of the phenol-aldehyde type characterized in the liquid or fusible solid form as hardenable under the action of heat which comprises reacting a phenol with aqueous formaldehyde in the presence of metallic magnesium, the amount of formaldehyde based on the weight of the phenol ranging from less than the equimolecular amount to three times the amount.

4. Process of preparing a resinous product of the phenol-aldehyde type which comprises reacting a phenol with formaldehyde in proportions ranging from less than one mol of the formaldehyde for each mol of phenol to three mols of formaldehyde for each mol of the phenol in the presence of from three to fifty per cent of metallic magnesium and water.

REINHART MÜLLER.